(12) United States Patent
Kon et al.

(10) Patent No.: US 9,031,091 B2
(45) Date of Patent: May 12, 2015

(54) CONNECTION SYSTEM OF BUILDING FACILITY DEVICE MANAGING SYSTEM, CONNECTION METHOD OF BUILDING FACILITY DEVICE MANAGING SYSTEM, AND CONNECTION PROGRAM OF BUILDING FACILITY DEVICE MANAGING SYSTEM

(75) Inventors: Toshihito Kon, Tokyo (JP); Daigo Takaoka, Tokyo (JP); Fumiya Akamatsu, Tokyo (JP); Hidenori Takagi, Tokyo (JP)

(73) Assignee: Hitachi System, Ltd., Tokyo (JP)

( * ) Notice: Subject to any disclaimer, the term of this patent is extended or adjusted under 35 U.S.C. 154(b) by 142 days.

(21) Appl. No.: 13/819,567

(22) PCT Filed: Mar. 8, 2012

(86) PCT No.: PCT/JP2012/055958
§ 371 (c)(1),
(2), (4) Date: Feb. 27, 2013

(87) PCT Pub. No.: WO2013/057971
PCT Pub. Date: Apr. 25, 2013

(65) Prior Publication Data
US 2014/0050229 A1 Feb. 20, 2014

(30) Foreign Application Priority Data
Oct. 19, 2011 (JP) ................................. 2011-229348

(51) Int. Cl.
| | |
|---|---|
| H04L 29/06 | (2006.01) |
| H04L 12/28 | (2006.01) |
| G05B 15/02 | (2006.01) |
| H04L 29/08 | (2006.01) |

(52) U.S. Cl.
CPC ............ *H04L 69/08* (2013.01); *H04L 12/2823* (2013.01); *G05B 15/02* (2013.01); *H04L 67/12* (2013.01)

(58) Field of Classification Search
None
See application file for complete search history.

(56) References Cited

U.S. PATENT DOCUMENTS

| | | |
|---|---|---|
| 2006/0067209 A1 | 3/2006 | Sheehan et al. |
| 2008/0056261 A1 | 3/2008 | Osborn et al. |

FOREIGN PATENT DOCUMENTS

| | | |
|---|---|---|
| JP | 3366228 B2 | 1/2003 |
| JP | 2007318328 A | 12/2007 |

OTHER PUBLICATIONS

Hidekazu Kuroki, et al., "An Implementation of Seamless Access Method for Facility Network with the IPv6 Protocol", IPSJ SIG Technical Reports 2006-UBI11(8), May 23, 2006, vol. 2006 No. 54, pp. 51-58.

(Continued)

*Primary Examiner* — Anh-Vu Ly
(74) *Attorney, Agent, or Firm* — McCormick, Paulding & Huber LLP (57) ABSTRACT

Operations of a building facility monitoring device and an IP network monitoring device are coordinated with each other. In a connection system of a building facility device managing system, when a status of the IP network monitoring device is changed, a monitoring-device-status managing unit 301 provides parameter information unique for a BACnet protocol to the changed status and stores it. If the status is not an operation command, a coordinated-packet-generation transmitting/receiving unit 302 generates a packet of the BACnet protocol based on a status and parameter information of a specific IP network monitoring device to transmit it to a building facility device managing system 103. If the status is the operation command, it acquires a status and parameter information of the specific IP network monitoring device from a management database 401, and generates a packet of the BACnet protocol based on the status and the parameter information to transmit it to the building facility device managing system 103.

3 Claims, 7 Drawing Sheets

(56) References Cited

OTHER PUBLICATIONS

S. Wang, et al, "Investigation on intelligent building standard communication protocols and application of IT technologies", Automation in Construction 13, (2004) 607-619.

Search Report for Singapore Patent Application No. 201301496-4 dated Jul. 5, 2013.

Canadian Office Action dated Jan. 7, 2015 corresponding to Canadian application No. 2,807,734.

FIG. 3A
MONITORING PACKET DATA EXAMPLE OF BUILDING EQUIPMENT DEVICE MANAGING SYSTEM 103:

| # | LOGICAL NAME | SPECIFIC EXAMPLE | COMMENT |
|---|---|---|---|
| 1 | INSTANCE No | 0~4194303 | ID PROVIDED COMMONLY TO AND UNIQUELY FOR BOTH SYSTEMS OF BUILDING FACILITY DEVICE MANAGING SYSTEM 103 AND IP NETWORK DEVICE MANAGING SYSTEM 201 IN ORDER TO IDENTIFY BUILDING FACILITY MONITORING DEVICE 101 BY THESE SYSTEMS |
| 2 | STATUS | 0,1 | NUMERICAL VALUE (FLAG) FOR INDICATING ACTIVE STATUS OF BUILDING FACILITY DEVICE 101 0: STOP, 1: ACTIVATION |
| 3 | PARAMETER | power | TYPE OF PARAMETER HELD BY BUILDING FACILITY DEVICE 101 |
| 4 | OBJECT TYPE | 0~31 | OBJECT FORMAT FOR INDICATING TYPE OF OBJECT DEFINED ON MANAGEMENTS OF BOTH SYSTEMS |
| 5 | PRESET TEMPERATURE | 18~30 | UPPER/LOWER PRESET TEMPERATURE OF AIR CONDITIONER |

FIG. 3B
MONITORING PACKET ITEM EXAMPLE:

| INSTANCE No | STATUS | PARAMETER | OBJECT TYPE | PRESET TEMPERATURE | COMMENT |
|---|---|---|---|---|---|
| 11 | 1 | power | 1 | --- | LIGHTING DEVICE |
| 12 | 0 | power | 1 | --- | LIGHTING DEVICE |
| 13 | 1 | power | 1 | --- | LIGHTING DEVICE |
| 21 | 1 | power | 2 | --- | DISASTER PREVENTION |
| 22 | 1 | power | 2 | --- | DISASTER PREVENTION |
| 23 | 1 | power | 2 | --- | DISASTER PREVENTION |
| 24 | 1 | power | 2 | --- | DISASTER PREVENTION |
| 31 | 1 | power | 3 | 28 | AIR CONDITIONER |
| 32 | 0 | power | 3 | 28 | AIR CONDITIONER |
| 33 | 1 | power | 3 | 28 | AIR CONDITIONER |

FIG. 3C
MONITORING PACKET EXAMPLE:

"33, 1, power, 3, 28"

FIG. 4A

MONITORING PACKET DATA EXAMPLE OF IP NETWORK DEVICE MANAGING SYSTEM 201:

| # | LOGICAL NAME | SPECIFIC EXAMPLE | COMMENT |
|---|---|---|---|
| 1 | HOST NAME | name1.co.jp | HOST NAME OF BUILDING FACILITY MONITORING DEVICE 101 MANAGED BY BUILDING FACILITY DEVICE MANAGING SYSTEM 103 |
| 2 | STATUS | 0,1 | NUMERICAL VALUE (FLAG) FOR INDICATING OPERATION STATUS OF BUILDING FACILITY MONITORING DEVICE 101<br>0: STOP, 1: ACTIVATION |
| 3 | CAMERA ZOOM | 0,1 | NUMERICAL VALUE OF MONITORING-CAMERA ZOOM CONTROL<br>0: ZOOM-IN, 1: ZOOM-OUT |

FIG. 4B

MONITORING PACKET ITEM EXAMPLE:

| HOST NAME | STATUS | CAMERA ZOOM | COMMENT |
|---|---|---|---|
| name1.co.jp | 1 | --- | NETWORK DEVICE |
| name2.co.jp | 0 | --- | NETWORK DEVICE |
| name3.co.jp | 1 | --- | NETWORK DEVICE |
| name4.co.jp | 1 | --- | NETWORK DEVICE |
| name5.co.jp | 1 | --- | NETWORK DEVICE |
| name6.co.jp | 1 | --- | NETWORK DEVICE |
| camera1.co.jp | 1 | 1 | NETWORK DEVICE |
| camera2.co.jp | 0 | 0 | NETWORK DEVICE |
| camera3.co.jp | 1 | 1 | NETWORK DEVICE |

FIG. 4C

MONITORING PACKET EXAMPLE:

"camera1.co.jp, 1, 1"

FIG. 7A
MANAGEMENT DB EXAMPLE:

| # | LOGICAL NAME | SPECIFIC EXAMPLE | COMMENT |
|---|---|---|---|
| 1 | HOST NAME | name1.co.jp | HOST NAME OF BUILDING FACILITY MONITORING DEVICE MANAGED BY BUILDING FACILITY DEVICE MANAGING SYSTEM 103 |
| 2 | STATUS | 0,1 | NUMERICAL VALUE FOR INDICATING STATUS OF BUILDING FACILITY MONITORING DEVICE MANAGED BY BUILDING FACILITY DEVICE MANAGING SYSTEM 101 0: STOP, 1:ACTIVATION |
| 3 | PARAMETER | power | TYPE OF PARAMETER HELD BY BUILDING FACILITY MONITORING DEVICE MANAGED BY BUILDING FACILITY DEVICE MANAGING SYSTEM 101 |
| 4 | OBJECT TYPE | 0~31 | OBJECTIVE TYPE DEFINED ON MANAGEMENTS OF BOTH SYSTEMS |
| 5 | INSTANCE No | 0~4194303 | ID PROVIDED COMMONLY TO AND UNIQUELY FOR BOTH SYSTEMS OF BUILDING FACILITY DEVICE MANAGING SYSTEM 103 AND IP NETWORK DEVICE MANAGING SYSTEM 201 FOR IDENTIFYING BUILDING FACILITY MONITORING DEVICE 101 BY THESE SYSTEMS |
| 6 | CAMERA ZOOM | 0,1 | NUMERICAL VALUE OF MONITORING-CAMERA ZOOM CONTROL 0: ZOOM-IN, 1: ZOOM-OUT |
| 7 | PRESET TEMPERATURE | 18~30 | UPPER/LOWER PRESET TEMPERATURE OF AIR CONDITIONER |

FIG. 7B
MANAGEMENT DB EXAMPLE:

| HOST NAME | STATUS | PARAMETER | OBJECT TYPE | INSTANCE No | CAMERA ZOOM | PRESET TEMPERATURE |
|---|---|---|---|---|---|---|
| --- | 1 | power | 1 | 11 | --- | --- |
| --- | 0 | power | 1 | 12 | --- | --- |
| --- | 1 | power | 1 | 13 | --- | --- |
| --- | 1 | power | 2 | 21 | --- | --- |
| --- | 1 | power | 2 | 22 | --- | --- |
| --- | 1 | power | 2 | 23 | --- | --- |
| --- | 1 | power | 2 | 24 | --- | --- |
| --- | 1 | power | 3 | 31 | --- | 28 |
| --- | 0 | power | 3 | 32 | --- | 28 |
| --- | 1 | power | 3 | 33 | --- | 28 |
| name1.co.jp | 1 | --- | 4 | 40 | --- | --- |
| name2.co.jp | 0 | --- | 4 | 41 | --- | --- |
| name3.co.jp | 1 | --- | 4 | 42 | --- | --- |
| name4.co.jp | 1 | --- | 4 | 43 | --- | --- |
| name5.co.jp | 1 | --- | 4 | 44 | --- | --- |
| name6.co.jp | 1 | --- | 4 | 45 | --- | --- |
| camera1.co.jp | 1 | --- | 4 | 46 | 1 | --- |
| camera2.co.jp | 0 | --- | 4 | 47 | 0 | --- |
| camera3.co.jp | 1 | --- | 4 | 48 | 1 | --- |

CONNECTION SYSTEM OF BUILDING FACILITY DEVICE MANAGING SYSTEM, CONNECTION METHOD OF BUILDING FACILITY DEVICE MANAGING SYSTEM, AND CONNECTION PROGRAM OF BUILDING FACILITY DEVICE MANAGING SYSTEM

CROSS REFERENCE TO RELATED APPLICATIONS

This application is entitled to the benefit of and incorporates by reference essential subject matter disclosed in International Patent Application No. PCT/JP2012/55958 filed on Mar. 8, 2012 and Japanese Patent Application No. 2011-229348 filed Oct. 19, 2011.

TECHNICAL FIELD

The present invention relates to a connection system of a building facility device managing system, a connection method of a building facility device managing system, and a connection program of a building facility device managing system, which connect the building facility device managing system for managing a plurality of building facility monitoring devices with an IP network device managing system for managing an IP network monitoring device such as a router and a personal computer. More particularly, the present invention relates to a connection system of a building facility device managing system, a connection method of a building facility device managing system, and a connection program of a building facility device managing system, which can coordinate operation of the building facility monitoring device connected to the building facility device managing system with operation of the IP network monitoring device connected to the IP network device managing system.

BACKGROUND ART

Generally, in building facility of a company or others, a building facility device managing system for integrally controlling a plurality of building facility monitoring devices for a plurality of air conditioners, lighting devices, door opening/closing devices, and others is installed via a network. Each building facility monitoring device and the building facility device managing system are connected to each other via the Ethernet (Registered trademark) whose communication is generalized with using a communication protocol such as "BACnet" (Building Automation and Control Networking protocol: communication protocol standard for intelligent building network) and "Lontalk" (Local Operation Network: communication protocol standard for connecting a device such as a lighting device, a switch, and a temperature sensor mounted with a neuron chip for operation). On the other hand, in building facility of a company or others, a computer network has been structured along with development of a computer technology so that a lot of personal computers and IP monitoring cameras are connected to a server via an IP network such as LAN based on TCP/IP protocols. However, specifications of the BACnet and the Lontalk which are communication standards on the above-described building facility device managing system side are different from those of the TCP/IP protocols which are communication standard on the IP network device managing system side.

Note that Japanese Patent Application Laid-Open Publication No. 3366228 is cited as a document describing a technique of performing network connection based on a different protocol. This document describes a technique by which the SNMP protocol and the non-SNMP protocol are accessible from each other so that all devices in the network can be monitored and controlled by one monitoring control device, by providing: means for identifying that a signal of a SNMP protocol received from a transmission-source device connected to a network is to be converted into which non-SNMP protocol; means for converting the signal into the non-SNMP protocol used by a transmission-destination device connected to another network with reference to a conversion table prepared by the identifying means, and then, transmitting it to the transmission-destination device; means for identifying that a signal of the non-SNMP protocol received from the transmission-source device connected to the network is to be converted into what type of the non-SNMP protocol; and means for converting the signal into the SNMP protocol used by the transmission-destination device connected to the network with reference to the conversion table provided by the identifying means, and then, transmitting it to the transmission-destination device.

DISCLOSURE OF THE INVENTION

As the technique described in the above-described Japanese Patent Application Laid-Open Publication No. 3366228, it is described that a SNMP protocol and a non-SNMP protocol are converted into a non-SNMP protocol used by a transmission-destination device connected to another network with reference to the conversion table between the SNMP protocol and the non-SNMP protocol in order to connect between the networks based on different protocols. However, the building facility device managing system and the IP network device managing system are not coordinated with each other while they control a plurality of individual devices, and therefore, there is a problem that it is difficult to provide building-facility users with advanced building environment.

This problem will be specifically explained as follows. In an IP monitoring camera used as a device for security, image monitoring and operation can be performed from only a terminal device of the building facility device managing system installed in a security guards room or others, and therefore, control such as zoom control and pan control of the IP monitoring camera with using a computer screen installed in other division such as a general affairs department of a company cannot be performed. For example, there is a failure that, even if smoke is detected by a smoke detector which is a disaster-prevention device, fire or others cannot be checked from the building facility device managing system with operating the IP monitoring camera, and there is a problem that it is difficult to provide building-facility users with the advanced building environment under which variously-installed building facility monitoring devices are utilized.

A preferred aim of the present invention is to solve problems caused by the above-described conventional techniques, which is to provide a connection system of a building facility device managing system, a connection method of a building facility device managing system, and a connection program of a building facility device managing system, which can coordinate operation of a building facility monitoring device managed by a building facility device managing system with operation of an IP network device managed by an IP network managing system.

In order to achieve the above-described preferred aim, the present invention has a first feature of a connection system of a building facility device managing system, which connects a building facility device managing system with an IP network monitoring device managing system, the building facility device managing system being for managing a building facility monitoring device installed in a building with using a BACnet or Lontalk protocol, the IP network device managing system being for managing an IP network monitoring device with using an IP protocol, so as to coordinate the building facility monitoring device with the IP network monitoring device. In the connection system, the IP network device managing system includes: a management database in which statuses of the building facility monitoring device and of the IP network monitoring device and parameter information of the IP protocol and the BACnet or Lontalk protocol are stored; a monitoring-device-status managing unit which stores the parameter information for filling a difference in a specification between the IP protocol and the BACnet or Lontalk protocol into the management database with being numbered when the status which is a state of the IP network monitoring device has been changed; and a coordinated-packet-generation transmitting/receiving unit which receives a command from the building facility device managing system and which generates a packet of the BACnet protocol based on the status and the parameter information acquired from the management database to transmit it to the building facility device managing system. The monitoring-device-status managing unit executes a first step when the status received with using the IP protocol from the IP network monitoring device has been changed from the status stored in the management database, the first step of providing the parameter information unique for the BACnet or Lontalk protocol to the changed status and storing it. The coordinated-packet-generation transmitting/receiving unit executes a second step when receiving an inquiry command of a status of a specific IP network monitoring device from the building facility device managing system, the second step of acquiring the status and the parameter information of the specific IP network monitoring device for which the inquiry has been received, acquired from the management database, and of generating the packet of the BACnet or Lontalk protocol based on the acquired status and parameter information to transmit it to the building facility device managing system, and executes a third step when receiving an operation command of the status of the specific IP network monitoring device from the building facility device managing system, the third step of acquiring the status and the parameter information of the specific IP network monitoring device for which the operation command has been received, acquired from the management database, and of generating the packet of the BACnet or Lontalk protocol based on the acquired status and parameter information to transmit it to the building facility device managing system.

Also, the present invention has a second feature of a connection method of a building facility device managing system for a computer system, which connects a building facility device managing system with an IP network device managing system, the building facility device managing system being for managing a building facility monitoring device installed in a building with using a BACnet or Lontalk protocol, the IP network device managing system being for managing the IP network monitoring device with using an IP protocol, which coordinates the building facility monitoring device with the IP network monitoring device, and in which the IP network managing system includes: a management database in which statuses of the building facility monitoring device and of the IP network monitoring device and the parameter information of an IP protocol and a BACnet or Lontalk protocol are stored; a monitoring-device-status managing unit which stores the parameter information for filling a difference in a specification between the IP protocol and the BACnet or Lontalk protocol into the management database with being numbered when the status which is a state of the IP network monitoring device has been changed; and an coordinated-packet-generation transmitting/receiving unit which receives a command from the building facility device managing system and which generates a packet of the BACnet protocol based on the status and the parameter information acquired from the management database to transmit it to the building facility device managing system. In the connection method, the monitoring-device-status managing unit is made to execute a first step when the status received with using the IP protocol from the IP network monitoring device has been changed from the status stored in the management database, the first step of providing the parameter information unique for the BACnet or Lontalk protocol to the changed status and storing it. The coordinated-packet-generation transmitting/receiving unit is made to execute a second step when receiving an inquiry command of a status of a specific IP network monitoring device from the building facility device managing system, the second step of acquiring the status and the parameter information of the specific IP network monitoring device for which the inquiry has been received, acquired from the management database, and of generating a packet of the BACnet or Lontalk protocol based on the acquired status and parameter information to transmit it to the building facility device managing system, and is made to execute a third step when receiving an operation command of the status of the specific IP network monitoring device from the building facility device managing system, the third step of acquiring the status and the parameter information of the specific IP network monitoring device for which the operation command has been received, acquired from the management database, and of generating a packet of the BACnet or Lontalk protocol based on the acquired status and parameter information to transmit it to the building facility device managing system.

Further, the present invention has a third feature of a connection program of a building facility device managing system for a computer system, which connects a building facility device managing system with an IP network device managing system, the building facility device managing system being for managing a building facility monitoring device installed in a building with using the BACnet or Lontalk protocol, the IP network device managing system being for managing an IP network monitoring device with using the IP protocol, which coordinates the building facility monitoring device with the IP network monitoring device, and in which the IP network device managing system includes: a management database in which statuses of the building facility monitoring device and of the IP network monitoring device and the parameter information of the IP protocol and the BACnet or Lontalk protocol are stored; a monitoring-device-status managing unit which stores the parameter information for filling a difference in a specification between the IP protocol and the BACnet or Lontalk protocol stored with being numbered, stored into the management database when the status which is a state of the IP network monitoring device has been changed; and an coordinated-packet-generation transmitting/receiving unit which receives a command from the building facility device managing system and which generates a packet of the BACnet protocol based on the status and the parameter information acquired from the management database to transmit it to the building facility device managing system. In the connection program, the monitoring-device-status managing unit is made to execute a first step when the status received with using the IP protocol from the IP network monitoring device has been changed from the status stored in the management database, the first step of providing the parameter information unique for the BACnet or Lontalk protocol to the changed status and storing it. The coordinated-packet-generation transmitting/receiving unit is made to execute a second step when receiving an inquiry command of a status of a specific IP network monitoring device from the building facility device managing system, the second step of acquiring the status and the parameter information of the specific IP network monitoring device for which the inquiry has been received, acquired from the management database, and of generating a packet of the BACnet or Lontalk protocol based on the acquired status and parameter information to transmit it to the building facility device managing system, and is made to execute a third step when receiving an operation command of the status of the specific IP network monitoring device from the building facility device managing system, the third step of acquiring the status and the parameter information of the specific IP network monitoring device for which the operation command has been received, acquired from the management database, and of generating a packet of the BACnet or Lontalk protocol based on the acquired status and parameter information to transmit it to the building facility device managing system.

The connection system of the building facility device managing system according to the present invention, the connection method of the building facility device managing system thereto, and the connection program of the building facility device managing system thereto can coordinate the operation of the building facility monitoring device with the operation of the IP network monitoring device, which have different protocols from each other, by making the monitoring-device-status managing unit execute a first step when the status received with using the IP protocol from the IP network monitoring device has been changed from the status stored in the management database, the first step of providing parameter information unique for the BACnet or Lontalk protocol to the changed status and storing it, and by making the coordinated-packet-generation transmitting/receiving unit execute a second step of acquiring the status and the parameter information of the specific IP network monitoring device for which an inquiry has been received, acquired from the management database, and of generating a packet of the BACnet or Lontalk protocol based on the acquired status and parameter information to transmit it to the building facility device managing system, and by making it execute a third step when receiving the operation command of the status of the specific IP network monitoring device from the building facility device managing system, the third step of acquiring the status and the parameter information of the specific IP network monitoring device for which the operation command has been received, acquired from the management database, and of generating a packet of the BACnet or Lontalk protocol based on the acquired status and parameter information to transmit it to the building facility device managing system.

BRIEF DESCRIPTIONS OF THE DRAWINGS

FIGS. 7A and 7B are diagrams for describing a management database according to the present embodiment.

BEST MODE FOR CARRYING OUT THE INVENTION

Hereinafter, an embodiment of a connection system of a building facility device managing system according to the present invention, a connection method of a building facility device managing system thereto, and a connection program of a building facility device managing system thereto will be described in detail with reference to drawings.

Figure 1:
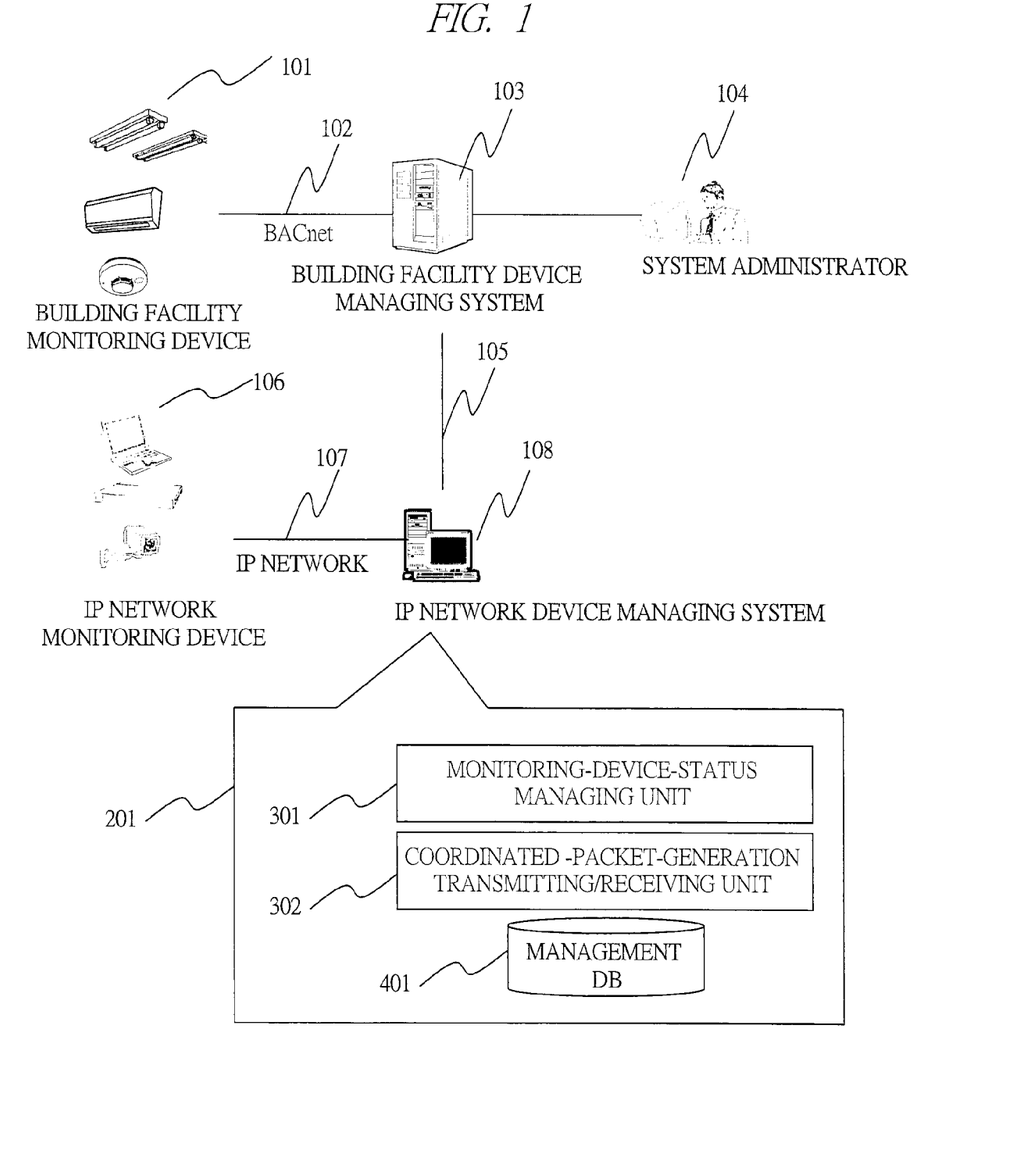
FIG. 1 is a diagram illustrating a computer system connected with a building facility device managing system and an IP network device managing system according to an embodiment of the present invention.

As illustrated in FIG. 1, a computer system in which an facility device managing system for controlling a plurality of building facility monitoring devices to be an object of the present invention and an IP network device managing system such as a personal computer are connected to each other is configured of: a building facility device managing system 103 which is a computer connected to building facility monitoring devices 101 including an air conditioner, a lighting device, and a smoke detector which is a disaster-prevention device and a managing computer 104 for a system administrator via a communication line 102 such as BACnet; an IP network device managing system 108 which is a computer connected to IP network monitoring devices 106 such as a lot of personal computers, routers, and IP monitoring cameras via a communication line of an IP network; and a communication line 105 which connects the IP network device managing system 108 and the building facility device managing system 103. The IP network device managing system 108 is configured of: a management database (DB) 401 in which an item (parameter information) contained in an IP network communication protocol and an item (parameter information) contained in a BACnet or Lontalk communication protocol; a monitoring-device-status managing unit 301 which manages a status (state) of the IP network monitoring device 106 when receiving an SNMP protocol and which stores the parameter information for filling a difference in a specification from the BACnet protocol into the management database 401 with being numbered when the status has been changed; and an coordinated-packet-generation transmitting/receiving unit 302 which receives a command signal from the building facility device managing system 103 and which generates a packet of the BACnet protocol based on the device information acquired from the management database 401 to transmit it.

Figure 2:
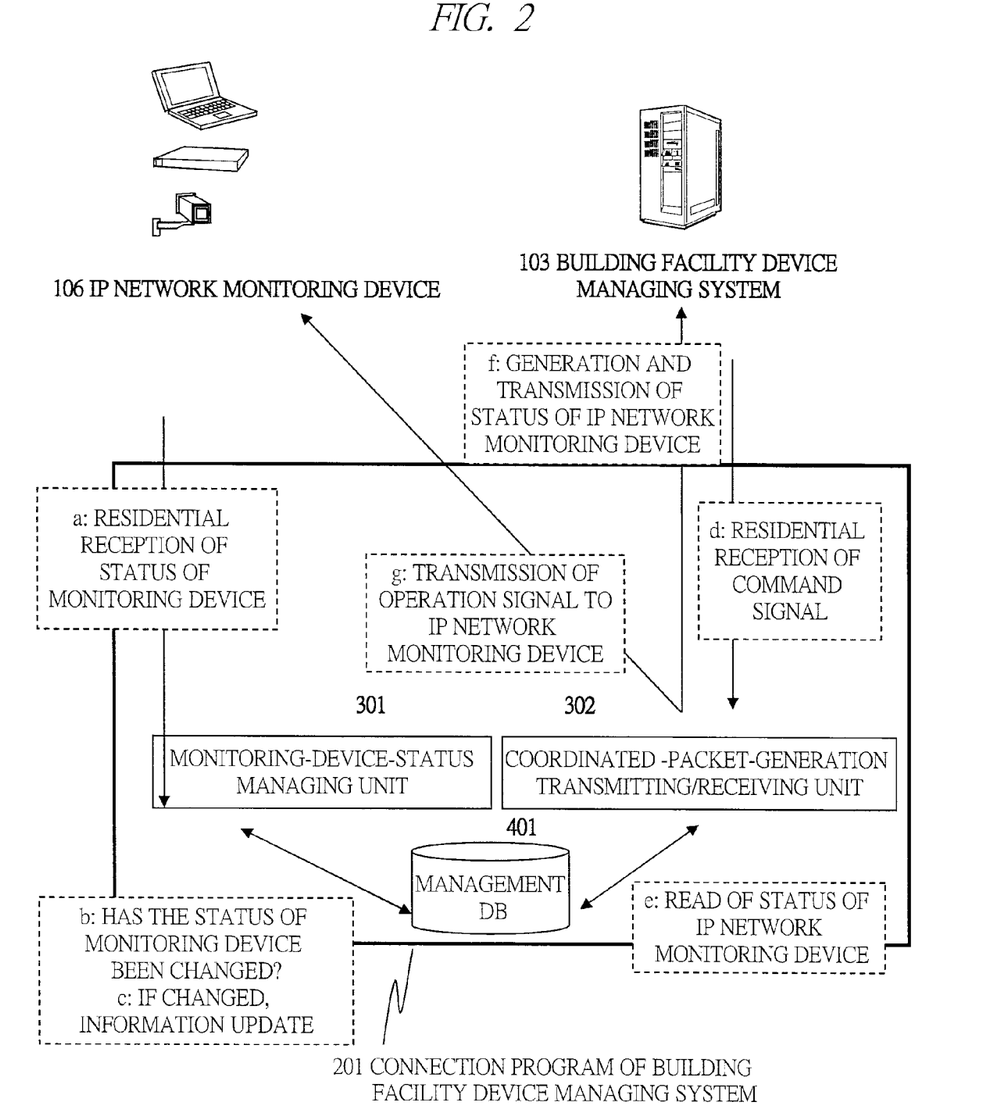
FIG. 2 is a diagram illustrating a schematic configuration of the IP network device managing system according to the present embodiment.

As illustrated in FIG. 2, the IP network device managing system 108 is configured so that the monitoring-device-status managing unit 301 executes a function "a" of always receiving the status of the IP network monitoring device 106, a function "b" of determining whether the status received by the function "a" has been changed or not, and a function "c" of updating a status of the device stored in the management database 401 when the changing is determined by the function "b", and so that the coordinated-packet-generation transmitting/receiving unit 302 executes a function "d" of always receiving the command signal from the building facility device managing system 103, a function "e" of reading the status of the IP network monitoring device from the management database 401 when it is determined by the function "d" that the command has been received, a function "f" of generating the status of the IP network monitoring device read by the function "e" in response to the command signal to transmit it to the building facility device managing system 103, and a function "g" of transmitting an operation signal to the IP network monitoring device 106.

Figure 3A:
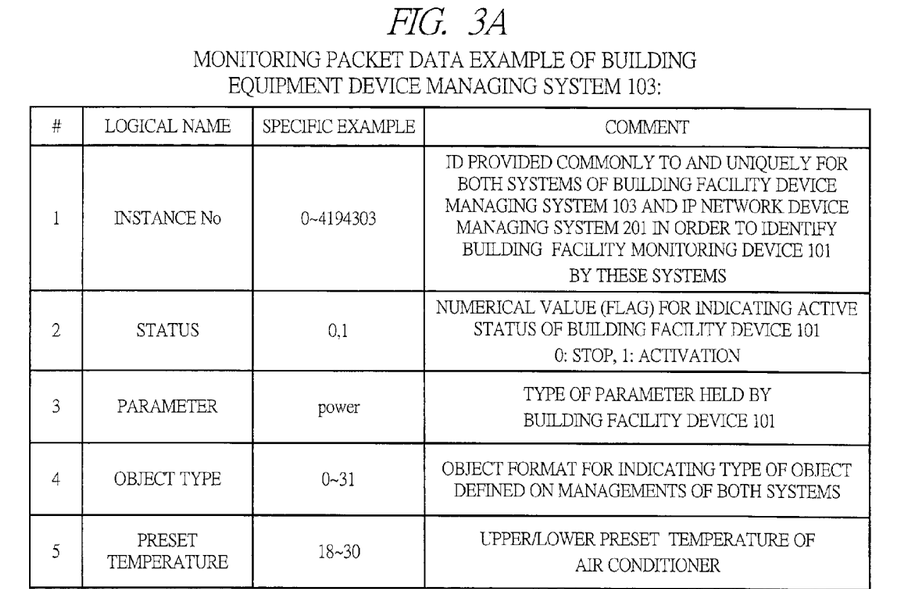
FIGS. 3A to 3C are diagrams for describing a packet data monitored by the building facility device managing system according to the present embodiment.
Figure 3B:
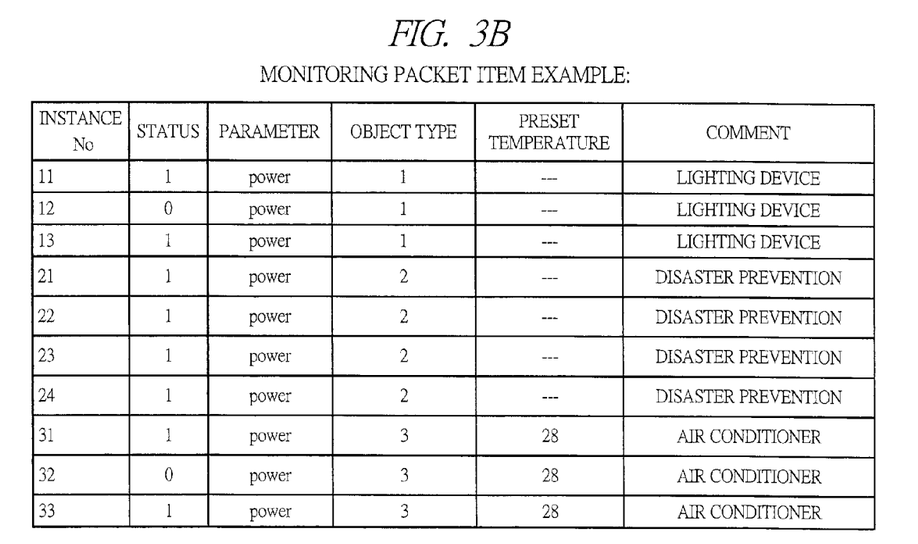
Figure 3C:
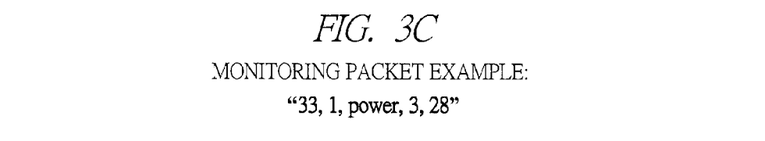

As illustrated in FIG. 3A, for monitoring packet data of the building facility monitoring device monitored by the building facility device managing system 103, one record is formed of respective items which are, for example: "Instance No." which is an ID (identifier) provided commonly to and uniquely for the both systems of the building facility device managing system 103 and the IP network device managing system 108 in order to identify the building facility monitoring device 101 by the building facility device managing system 103 and the IP network device managing system 108; "Status" indicating a numerical value (flag 0: stop, 1: activation) for indicating an operating state of the building facility monitoring device 101; "Parameter" indicating a type of a parameter held by the building facility monitoring device 101; "Object Type" indicating a type of an object defined on the managements of the both systems; and "Preset Temperature" indicating upper and lower preset temperature values of an air conditioner, and others. More specifically, as illustrated in FIG. 3B, for a lighting having the "Instance No. 11", the "Status" is set as "1" (activation), the "Parameter" is set as "power", the "Object Type" is set as "1" (which is the type provided to the "lighting"), and the "Preset Temperature" is set as "blank". For a lighting having the "Instance No. 12", the "Status" is set as "0" (stop), the "Parameter" is set as "power", the "Object Type" is set as "1" (the "lighting"), and the "Preset Temperature" is set as "blank". For a disaster-prevention device having the "Instance No. 21", the "Status" is set as "1" (activation), the "Parameter" is set as "power", the "Object Type" is set as "2" (which is the type provided to the "disaster-prevention device"), and the "Preset Temperature" is set as "blank". For an air conditioner having the "Instance No. 31", the "Status" is set as "1" (activation), the "Parameter" is set as "power", the "Object Type" is set as "3" (which is the type provided to the "air conditioner"), and the "Preset Temperature" is set as "28" degrees Celsius. A monitoring packet signal is expressed as, for example, "33, 1, power, 3, 28" as illustrated in FIG. 3C.

Figure 4A:
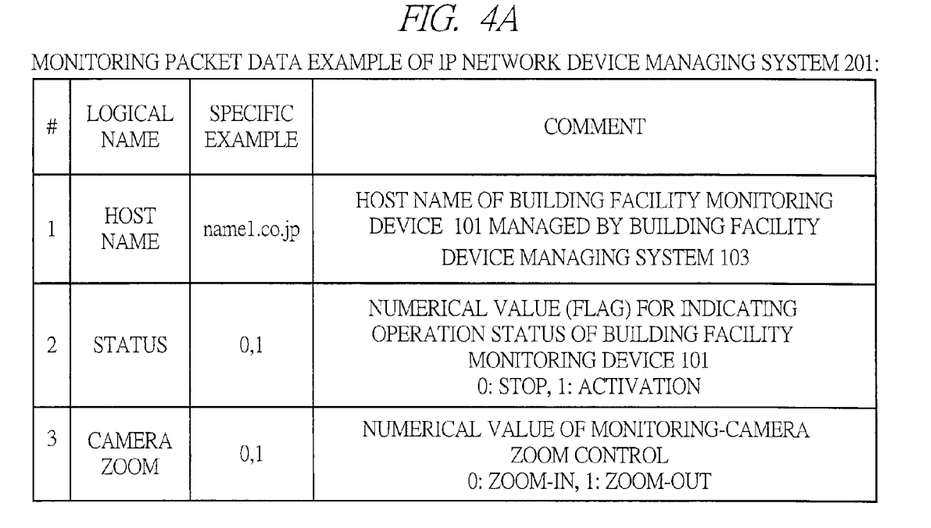
FIGS. 4A to 4C are diagrams for describing a packet data monitored by the IP network device managing system according to the present embodiment.
Figure 4B:
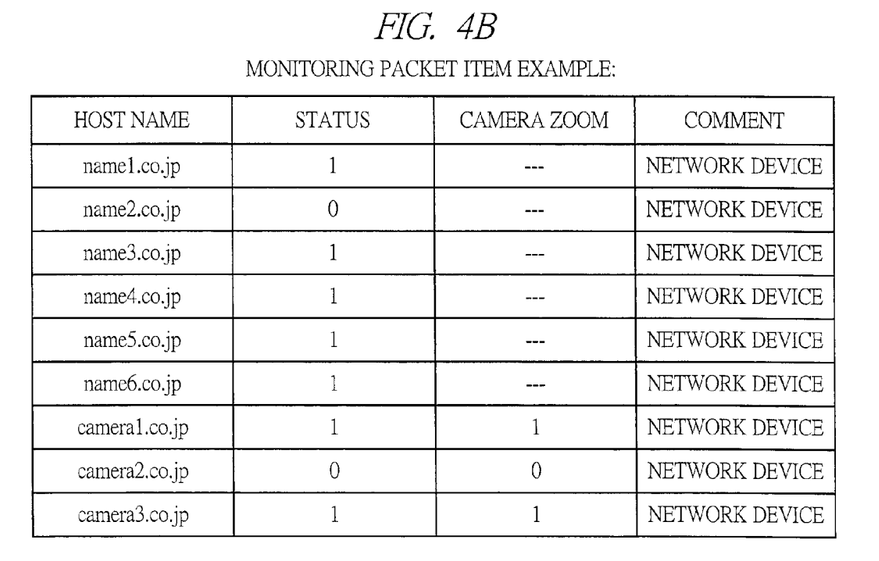
Figure 4C:
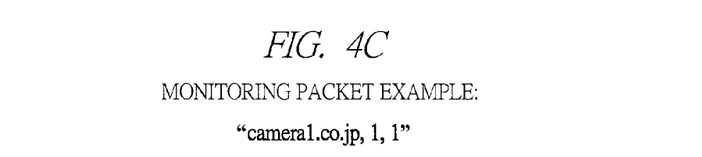

As illustrated in FIG. 4A, for packet data of the IP network monitoring device 106 monitored by the IP network device managing system 108, one record is formed of respective items which are, for example: "Host Name" of the building facility monitoring device 101 managed by the building facility device managing system 103; "Status" which is a numerical value (flag) for indicating an operating state of the building facility monitoring device 101; and "Camera Zoom" indicating a numerical value for controlling zoom of the IP monitoring camera. More specifically, as illustrated in FIG. 4B, for a personal computer having the "Host Name" of "name1.co.jp", the "Status" is set as "0, 1" (stop or activation), and the "Camera Zoom" is set as "blank". For a router having the "Host Name" of "name6.co.jp", the "Status" is set as "0, 1" (stop or activation), and the "Camera Zoom" is set as "blank". For an IP monitoring camera having the "Host Name" of "camera1.co.jp", the "Status" is set as "1" (activation), and the "Camera Zoom" is set as "1" (zoom-in). A monitoring packet signal is expressed as, for example, "camera1.co.jp, 1, 1" as illustrated in FIG. 4C.

As illustrated in FIG. 7A, for the management database 401, one record is formed of respective items (parameter information) which are: "Host Name" of the building facility monitoring device 101 managed by the building facility device managing system 103; "Status" indicating a numerical value (flag 0: stop, 1: activation) for indicating a state of the building facility monitoring device 101 managed by the building facility device managing system 103; "Parameter" indicating a type of a parameter held by the building facility monitoring device 101; "Object Type" indicating a type of an object defined on the managements of the both systems; "Instance No." which is an ID (identifier) provided commonly to and uniquely for the both systems of the building facility device managing system 103 and the IP network device managing system 108 in order to identify the building facility monitoring device 101 by the building facility device managing system 103 and the IP network device managing system 108; "Camera Zoom" indicating a numerical value for controlling zoom of the IP monitoring camera; and "Preset Temperature" indicating a temperature set in an air conditioner. More specifically, as illustrated in FIG. 7B, on the building facility monitoring device side, for a lighting having the "Host Name" of "blank" because it is not the building facility monitoring device, the "Status" is stored as "1" (activation), the "Parameter" is stored as "power", the "Object Type" is stored as "1", the "Instance No." is stored as "11", the "Camera Zoom" and the "Preset Temperature" are stored as "blank" because it is the IP network monitoring device. For a disaster-prevention device having the "Host Name" of "blank" because it is not the building facility monitoring device, the "Status" is stored as "0" (stop), the "Parameter" is stored as "power", the "Object Type" is stored as "1", the "Instance No." is stored as "12", the "Camera Zoom" and the "Preset Temperature" are stored as "blank" because it is the IP network monitoring device. For an air conditioner having the "Host Name" of "blank" because it is not the building facility monitoring device, the "Status" is stored as "1" (activation), the "Parameter" is stored as "power", the "Object Type" is stored as "1", the "Instance No." is stored as "13", and the "Camera Zoom" and the "Preset Temperature" are stored as "blank" because it is the IP network monitoring device. On the IP network monitoring device side, for a personal computer having the "Host Name" of "name1.co.jp", the "Status" is stored as "1" (activation), the "Parameter" is stored as "blank" because it is not the building facility, the "Object Type" is stored as "4" (which is the type provided uniformly onto the IP network side), the "Instance No." is stored as "40", and the "Camera Zoom" and the "Preset Temperature" are stored as "blank" because it is out of an object to be managed. For an IP monitoring camera having the "Host Name" of "camera1.co.jp", the "Status" is stored as "1" (activation), the "Parameter" is stored as "blank" because it is not the building facility, the "Object Type" is stored as "4", the "Instance No." is stored as "46", the "Camera Zoom" is stored as "1" (zoom-out), and the "Preset Temperature" is stored as "blank" because it is out of an object to be managed.

That is, the management database 401 according to the present embodiment stores data whose one record is formed of the respective items (parameter information) which are: the "Host Name" contained in the IP network protocol; the "Status" indicating the state of the monitoring device contained in the protocol of the building facility monitoring device; the "Parameter" indicating the type of the parameter of the monitoring device contained in the protocol of the building facility monitoring device; the "Object Type" of the monitoring device contained in the protocol of the building facility monitoring device in order to identify either the building facility monitoring device or the IP network monitoring device; the "Instance No." provided individually as the identifier in order to identify each of individual building facility monitoring devices and IP network monitoring devices; and the "Camera Zoom" and the "Preset Temperature" for controlling individually the IP network monitoring devices, and is configured to register each packet item used for a packet signal of the building facility device managing system and the IP network device managing system.

In the embodiment, note that the lighting, the air conditioner, and the disaster-prevention device (fire detector, smoke detector) are cited as the object devices monitored by the building facility device managing system, and the personal computer, the router, and others are cited as the object devices managed by the IP network device managing system. However, the devices to be objected in the present invention are not limited to these devices, and, for example, a lock device of the building, and an opening/closing (monitoring) device of a window or a door thereof, and other devices may be the objects, and therefore, in accordance with the object devices, a logical name to be stored in the management database 401 can be also added, or panning can be also added as another operation of the IP monitoring camera.

Figure 5:
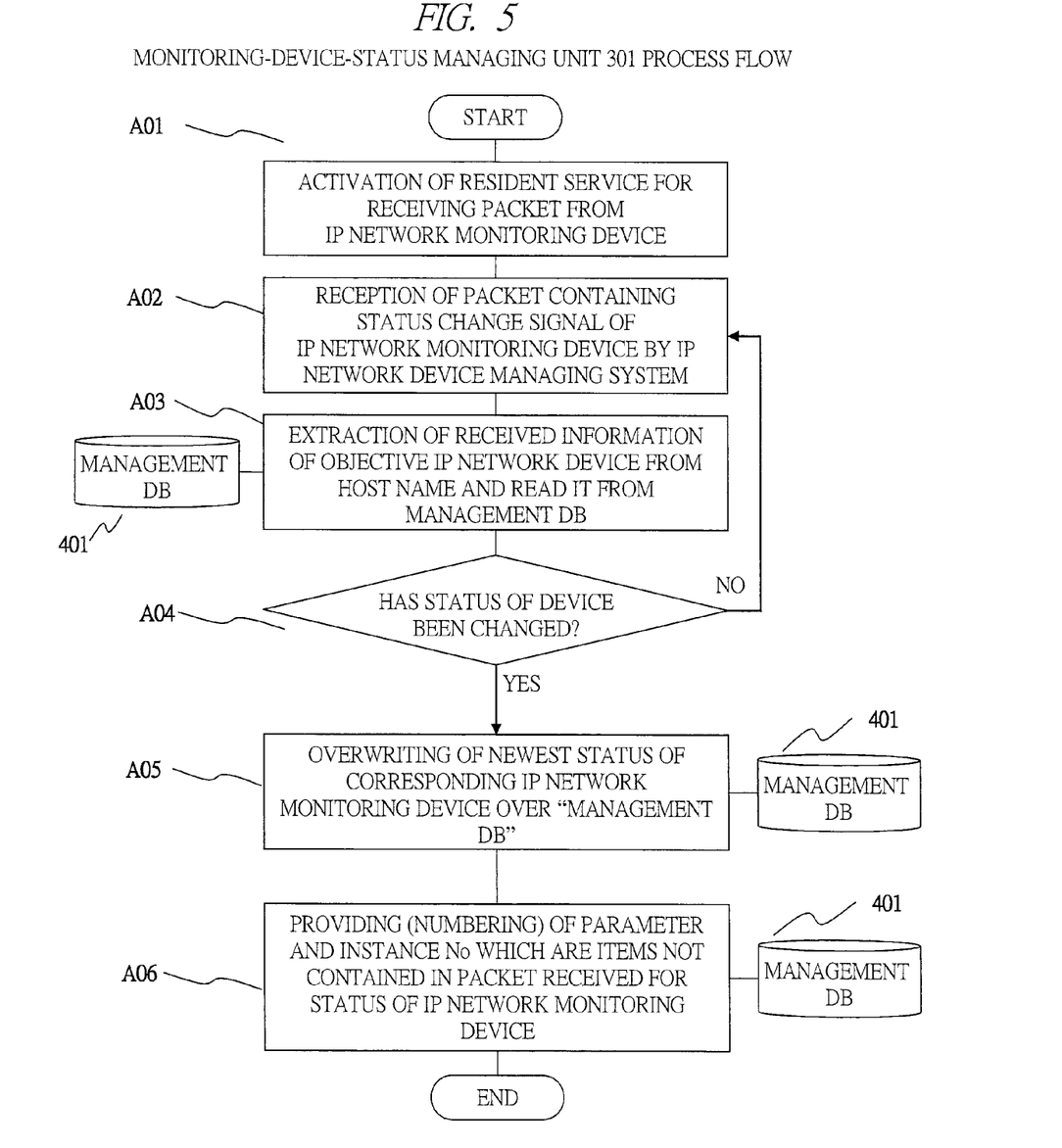
FIG. 5 is a diagram illustrating a process flow of a monitoring-device-status managing unit according to the present embodiment.

Incidentally, in the computer system which achieves the connection system of the building facility device managing system, the connection method of the building facility device managing system, and the connection program of the building facility device managing system according to the present embodiment configured as described above, when the status of the IP network monitoring device is changed, the operation is performed so as to store this status change together with the newly-provided "Parameter" and "Instance No." by making the monitoring-device-status managing unit 301 execute steps as illustrated in FIG. 5, the steps including: a step "A01" of activating a resident service for receiving a packet containing a status change signal from the IP network monitoring device 106; when a packet containing the status change signal is transmitted from the IP network monitoring device 106 or when the packet containing the status change signal is received by the resident service of the step A01, a step "A02" of receiving the status change signal received from the IP network monitoring device 106 by the connection program 201 of the building facility device managing system of the IP network device managing system 108; a step "A03" of extracting the information of the object IP network monitoring device received by the step A02 based on the Host name and of reading the information from the management database 401; a step "A04" of comparing the received status indicating whether the device status is changed or not which is read by the step A03 with the read status, of determining whether or not, and of returning to the step A02 if no change is determined; if the change is determined in the step A04, a step "A05" of overwriting (updating) the status of the IP network monitoring device whose status has been changed into the newest status over the management database 401; and a step "A06" of newly numbering the "Parameter" and the "Instance No." for the building facility device managing system which are not contained in the packet of the IP network monitoring device whose status has been changed for the record of the IP network monitoring device whose status has been changed, the record stored in the management database 401, of storing them in the management database 401, and of terminating the process.

Therefore, for example, when power supply of a specific personal computer is turned off so that it is turned into a stop state, the monitoring-device-status managing unit 301 according to the present embodiment can store the stop state ("Status") indicating the power-supply OFF of this specific personal computer and the numbered "Parameter" and "Instance No." in the management database 401, and can also perform similarly to other IP network monitoring devices.

Figure 6:
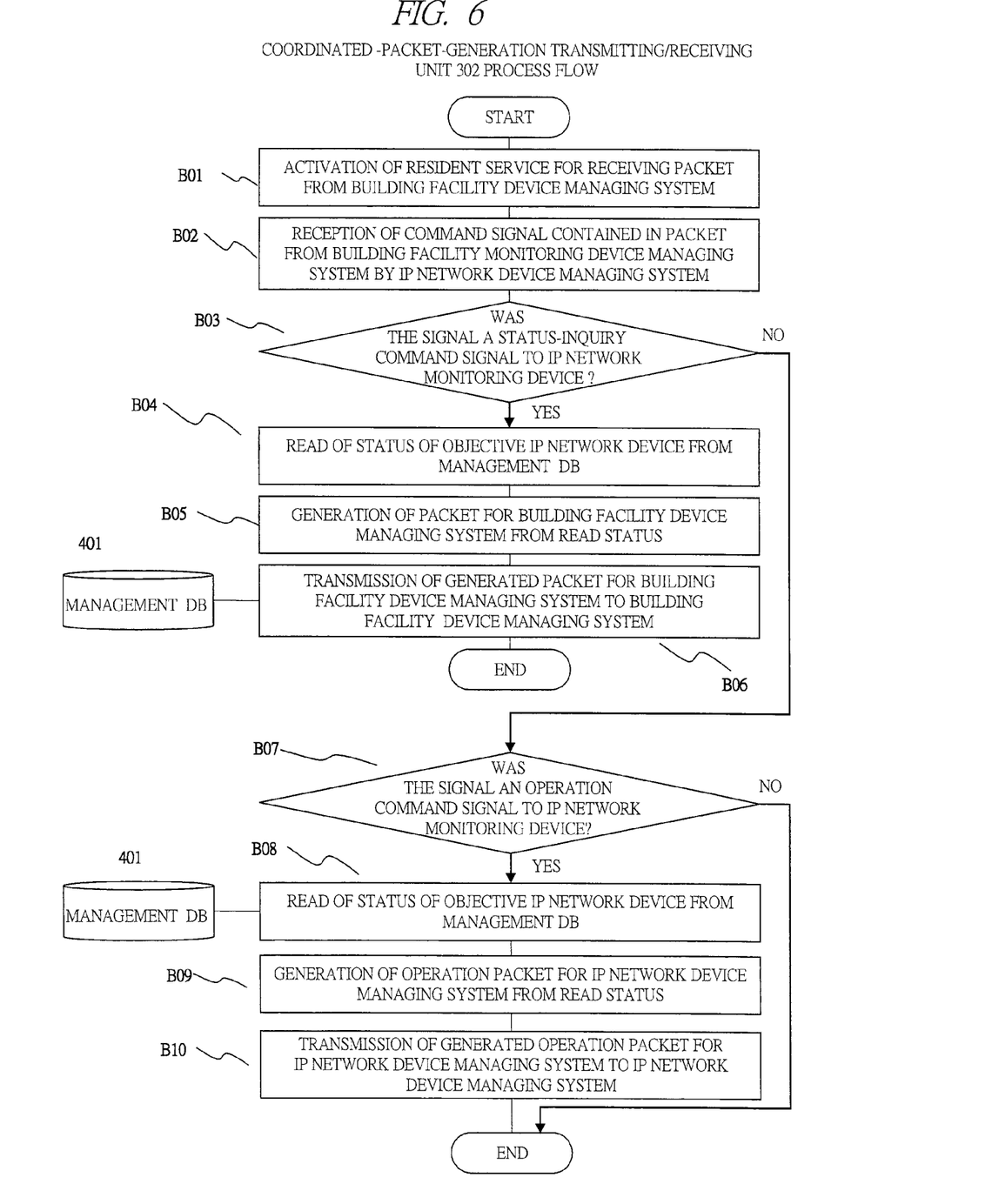
FIG. 6 is a diagram illustrating a process flow of a coordinated-packet-generation transmitting/receiving unit according to the present embodiment.

Next, the computer system including the connection system of the building facility device managing system according to the present embodiment is operated, when inquiry for the IP network monitoring device is issued from the building facility device managing system, so as to read the "Status" of the corresponding device from the management database 401, and besides, so as to generate an inquiry packet for the building facility device managing system 103 with the read "Status" together with the "Parameter" and the "Object Type" (also including the items of the "Camera Zoom" and the "Preset Temperature" depending on the device) to transmit it by making the coordinated-packet-generation transmitting/receiving unit 302 execute steps as illustrated in FIG. 6, the steps including: a step "B01" of activating a resident service for receiving a packet containing an inquiry command signal or an operation command signal for the device operation from the building facility device managing system 103; when the packet containing the inquiry command signal is transmitted from the building facility monitoring device 101, a step "B02" of receiving the packet containing the inquiry command signal by the IP network monitoring device managing system 108 with using the resident service of the step B01; a step "B03" of determining whether the received packet contains the inquiry command signal or not; if it is determined in the step B03 that the status inquiry command signal to the IP network monitoring device 106 is contained, a step "B04" of reading the "Status" of the objective IP network monitoring device 106 from the management database 401; a step "B05" of generating a packet for the building facility device managing system 103 based on the "Status" read by the step B04; and a step "B06" of transmitting the packet for the building facility device managing system 103 which has been generated by the step B05 to the building facility device managing system.

Subsequently, the operation of the IP network monitoring device is instructed by making the coordinated-packet-generation transmitting/receiving unit 302 according to the present embodiment execute steps when it is determined in the step B03 that the status inquiry signal to the IP network monitoring device 106 is not contained, the steps including: a step "B07" of determining whether the operation command signal to the IP network monitoring device 106 is contained in the received packet or not and of terminating the process if it is determined that the operation command signal is not contained; if it is determined in the step B07 that the operation command signal is contained, a step "B08" of reading the "Status" of the corresponding device from the management database 401; a step "B09" of generating a command packet for the building facility device managing system 103 with the "Status" of the objective IP network monitoring device read by the step B08 together with the "Parameter" and the "Object Type" (also including the items of the "Camera Zoom" and the "Preset Temperature" depending on the device); and Step B10 which transmits the instruction packet generated by the Step B09 to the IP network device managing system 108.

The computer system including the connection system of the building facility device managing system according to the present embodiment can coordinate the building facility device managing system with the IP network device managing system by, when the "Status" indicating the state of the IP network monitoring device 106 is changed as illustrated in FIG. 5, storing the Status change based on the IP network monitoring device 106 into the management database 401 with adding the "Parameter" and the "Instance No." for the building facility device managing system 103 executed by the monitoring-device-status managing unit 301, and besides, when the IP network monitoring device inquiry command or the IP network monitoring device operation command is received from the building facility device managing system 103 as illustrated in FIG. 6, by generating a packet with adding the inquiry command or the operation command to the "Parameter" and the "Instance No." for the building facility device managing system 103 to be stored in the management database 401 executed by the coordinated-packet-generation transmitting/receiving unit 302.

This coordination will be specifically described as follows. For example, in a case that the power supply to the personal computer which is the IP network monitoring device is turned off, the monitoring-device-status managing unit 301 registers the power-supply OFF (state: "Status") of this specific personal computer into the management database 401 by executing the process illustrated in FIG. 5, and, when the building facility device managing system 103 transmits the signal based on the instruction from the managing computer 104 of the system administrator, the coordinated-packet-generation transmitting/receiving unit 302 transmits the power-supply OFF (state: "Status") of the personal computer to the building facility device managing system 103 by executing the process at the upper stage of FIG. 6, so that the administrator of the managing computer 104 connected to the building facility device managing system 103 which has received this state can turn off the power supply to the air conditioner and the lighting which are the building facility monitoring devices in a room where the corresponding personal computer is located with using the building facility device managing system 103, or can make the building facility device managing system 103 instruct the coordinated-packet-generation transmitting/receiving unit 302 to perform the operation of the zoom-in, the panning, or others of the IP monitoring camera which is the IP network monitoring device by executing the process illustrated in FIG. 6 when the smoke detector for disaster prevention which is the building facility monitoring device detects smoke.

As another example, in the computer system including the connection system of the building facility device managing system according to the present embodiment, in a case that restart of the router which is the IP network monitoring device is required because failure occurs in the router, the building facility device managing system 103 can instruct the coordinated-packet-generation transmitting/receiving unit 302 to perform the stop and restart operations for the router by executing the process illustrated in FIG. 6. In a case that the IP network device managing system 108 detects increase of a temperature of the same router up to a predetermined temperature or higher, the monitoring-device-status managing unit 301 registers the fact of the predetermined temperature or higher into the management database 401 by executing the process described in FIG. 5, and the coordinated-packet-generation transmitting/receiving unit 302 transmits the temperature anomaly of the router to the building facility device managing system 103 by executing the process at the upper stage in FIG. 6, so that the administrator 104 of the managing computer connected to the building facility device managing system 103 which has received this temperature anomaly can control a temperature of an air conditioner which is the building facility device in a room where the corresponding router is located with using the building facility device managing system 103.

While the present invention has been illustrated and described with respect to a particular embodiment thereof, it should be appreciated by those of ordinary skill in the art that various modifications to this invention may be made without departing from the spirit and scope of the present.

The invention claimed is:

1. A connection method for a computer system which connects a building facility device managing system with an IP network device managing system, the building facility device managing system being for managing a building facility monitoring device installed in a building using a BACnet or Lontalk protocol, the IP network device managing system being for managing an IP network monitoring device using an IP protocol, which coordinates the building facility monitoring device with the IP network monitoring device, and in which the IP network managing system includes: a management database in which statuses of the building facility monitoring device and of the IP network monitoring device and the parameter information of an IP protocol and a BACnet or Lontalk protocol are stored; a monitoring-device-status managing unit which stores the parameter information for filling a difference in a specification between the IP protocol and the BACnet or Lontalk protocol into the management database with being numbered when a status which is a state of the IP network monitoring device has been changed; and an coordinated-packet-generation transmitting/receiving unit which receives a command from the building facility device managing system and which generates a packet of the BACnet protocol based on the status and the parameter information acquired from the management database to transmit it to the building facility device managing system, the monitoring-device-status managing unit being made to execute a first step when the status received with using the IP protocol from the IP network monitoring device has been changed from the status stored in the management database, the first step of providing the parameter information unique for the BACnet or Lontalk protocol to the changed status and storing it, and the coordinated-packet-generation transmitting/receiving unit being made to execute:

a second step when receiving an inquiry command of a status of a specific IP network monitoring device from the building facility device managing system, the second step of acquiring the status and the parameter information of the specific IP network monitoring device for which the inquiry has been received, acquired from the management database, and of generating a packet of the BACnet or Lontalk protocol based on the acquired status and parameter information to transmit it to the building facility device managing system; and a third step when receiving an operation command of the status of the specific IP network monitoring device from the building facility device managing system, the third step of acquiring the status and the parameter information of the specific IP network monitoring device for which the operation command has been received, acquired from the management database, and of generating a packet of the BACnet or Lontalk protocol based on the acquired status and parameter information to transmit it to the building facility device managing system.

2. A connection method for a computer system which connects a building facility device managing system with an IP network device managing system, the building facility device managing system being for managing a building facility monitoring device installed in a building using a BACnet or Lontalk protocol, the IP network device managing system being for managing an IP network monitoring device using an IP protocol, which coordinates the building facility monitoring device with the IP network monitoring device, and in which the IP network managing system includes: a management database in which statuses of the building facility monitoring device and of the IP network monitoring device and the parameter information of an IP protocol and a BACnet or Lontalk protocol are stored; a monitoring-device-status managing unit which stores the parameter information for filling a difference in a specification between the IP protocol and the BACnet or Lontalk protocol into the management database with being numbered when a status which is a state of the IP network monitoring device has been changed; and an coordinated-packet-generation transmitting/receiving unit which receives a command from the building facility device managing system and which generates a packet of the BACnet protocol based on the status and the parameter information acquired from the management database to transmit it to the building facility device managing system, the monitoring-device-status managing unit being made to execute a first step when the status received using the IP protocol from the IP network monitoring device has been changed from the status stored in the management database, the first step of providing the parameter information unique for the BACnet or Lontalk protocol to the changed status and storing it, and the coordinated-packet-generation transmitting/receiving unit being made to execute:

a second step when receiving an inquiry command of a status of a specific IP network monitoring device from the building facility device managing system, the second step of acquiring the status and the parameter information of the specific IP network monitoring device for which the inquiry has been received, acquired from the management database, and of generating a packet of the BACnet or Lontalk protocol based on the acquired status and parameter information to transmit it to the building facility device managing system.

3. A connection method for a computer system which connects a building facility device managing system with an IP network device managing system, the building facility device managing system being for managing a building facility monitoring device installed in a building using a BACnet or Lontalk protocol, the IP network device managing system being for managing an IP network monitoring device using an IP protocol, which coordinates the building facility monitoring device with the IP network monitoring device, and in which the IP network managing system includes: a management database in which statuses of the building facility monitoring device and of the IP network monitoring device and the parameter information of an IP protocol and a BACnet or Lontalk protocol are stored; a monitoring-device-status managing unit which stores the parameter information for filling a difference in a specification between the IP protocol and the BACnet or Lontalk protocol into the management database with being numbered when a status which is a state of the IP network monitoring device has been changed; and an coordinated-packet-generation transmitting/receiving unit which receives a command from the building facility device managing system and which generates a packet of the BACnet protocol based on the status and the parameter information acquired from the management database to transmit it to the building facility device managing system, the monitoring-device-status managing unit being made to execute a first step when the status received using the IP protocol from the IP network monitoring device has been changed from the status stored in the management database, the first step of providing the parameter information unique for the BACnet or Lontalk protocol to the changed status and storing it, and the coordinated-packet-generation transmitting/receiving unit being made to execute:

a third step when receiving an operation command of the status of the specific IP network monitoring device from the building facility device managing system, the third step of acquiring the status and the parameter information of the specific IP network monitoring device for which the operation command has been received, acquired from the management database, and of generating a packet of the BACnet or Lontalk protocol based on the acquired status and parameter information to transmit it to the building facility device managing system.

* * * * *

UNITED STATES PATENT AND TRADEMARK OFFICE
CERTIFICATE OF CORRECTION

| | |
|---|---|
| PATENT NO. | : 9,031,091 B2 |
| APPLICATION NO. | : 13/819567 |
| DATED | : May 12, 2015 |
| INVENTOR(S) | : Toshihito Kon et al. |

It is certified that error appears in the above-identified patent and that said Letters Patent is hereby corrected as shown below:

ON THE TITLE PAGE

Please correct the Assignee name, namely,
Hitachi System, Ltd.

To read as follows:
Hitachi Systems, Ltd.

Signed and Sealed this
Tenth Day of May, 2016

Michelle K. Lee
*Director of the United States Patent and Trademark Office*